May 25, 1937.  H. C. LISLE ET AL  2,081,489
FRUIT AND VEGETABLE CLEANING AND POLISHING MACHINE
Filed April 3, 1933  3 Sheets-Sheet 1
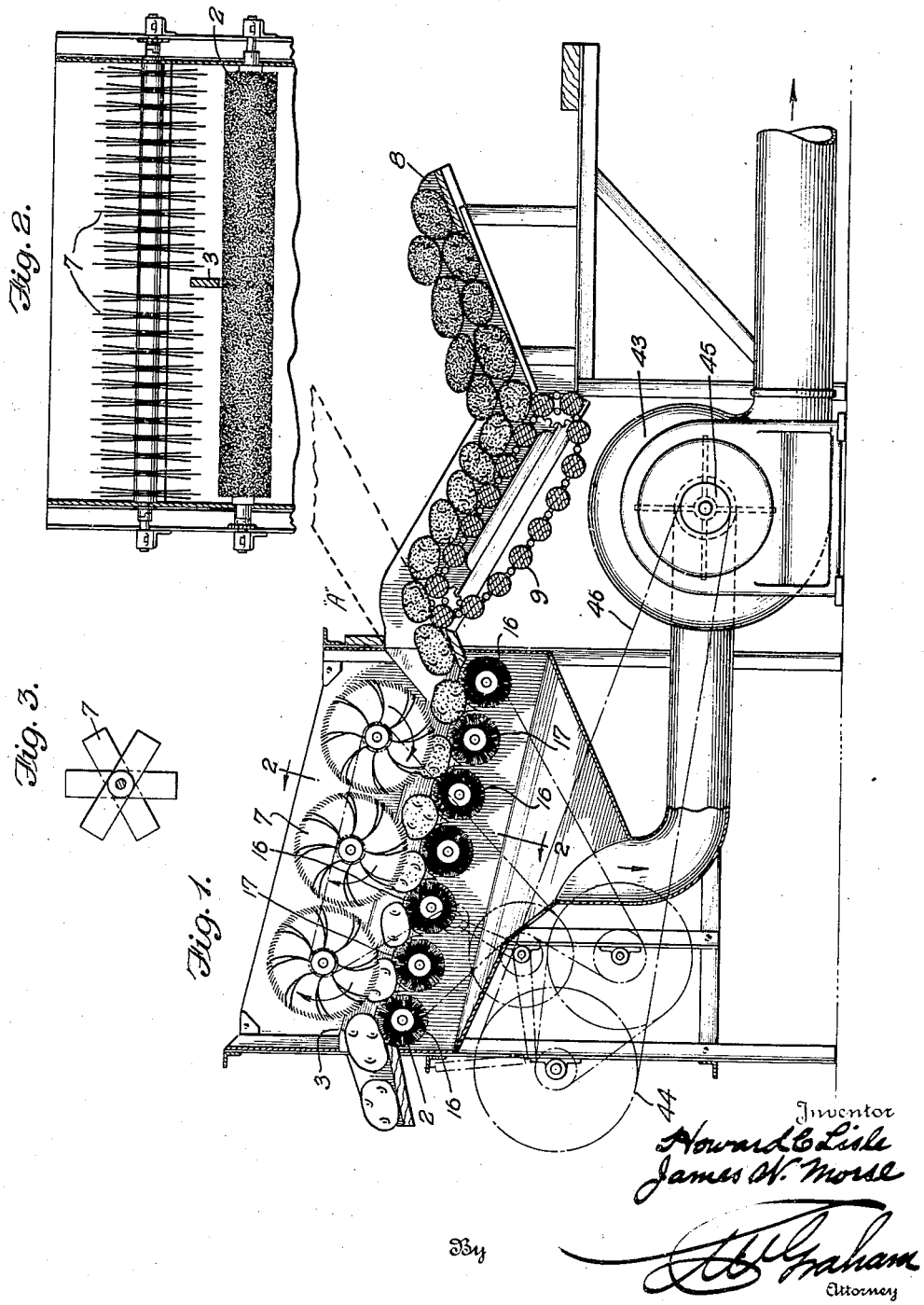

May 25, 1937.    H. C. LISLE ET AL    2,081,489
FRUIT AND VEGETABLE CLEANING AND POLISHING MACHINE
Filed April 3, 1933    3 Sheets-Sheet 2
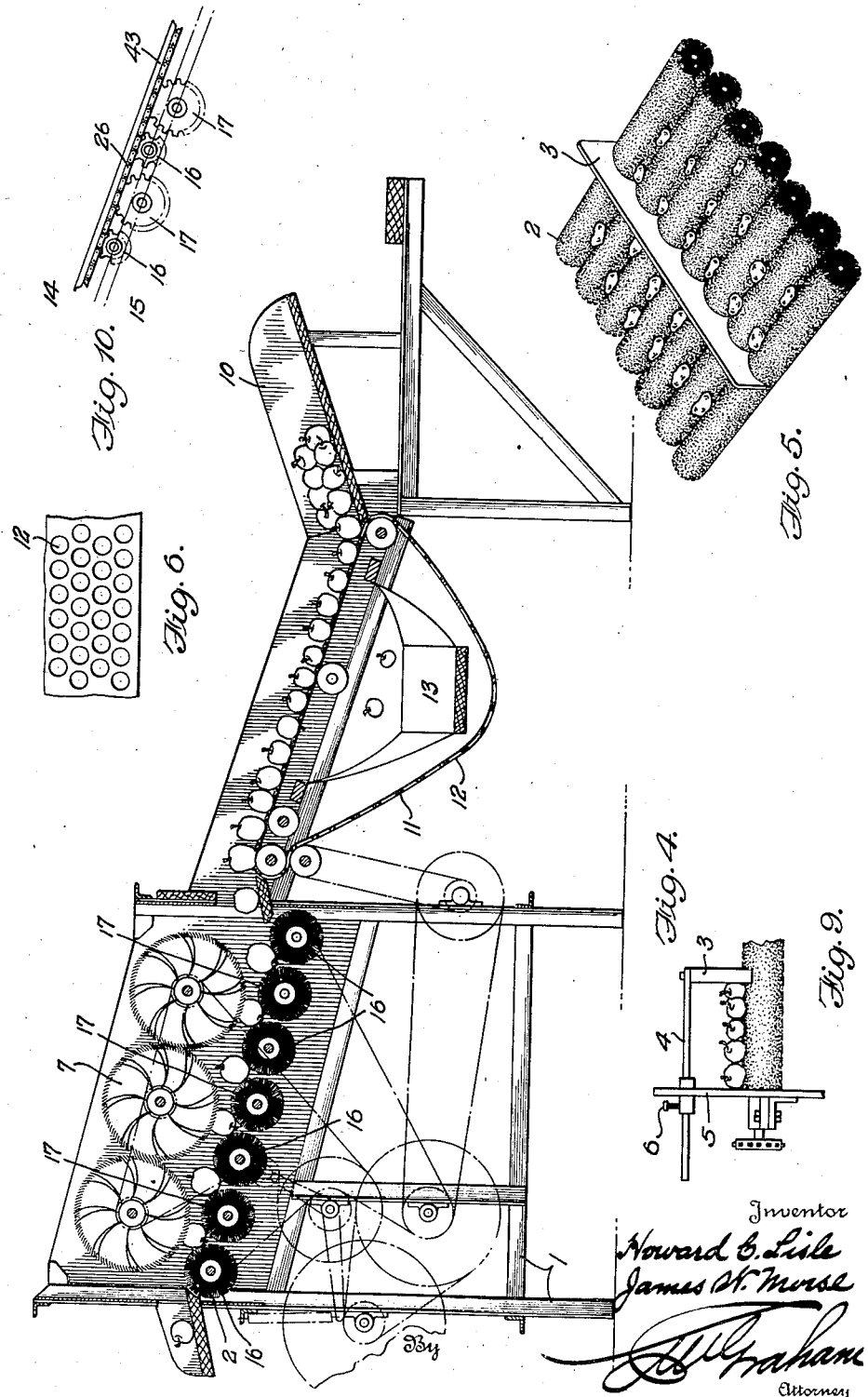

May 25, 1937.　　　H. C. LISLE ET AL　　　2,081,489
FRUIT AND VEGETABLE CLEANING AND POLISHING MACHINE
Filed April 3, 1933　　　3 Sheets-Sheet 3

Inventor
Howard C Lisle
James W. Morse
By
J. F. Graham
Attorney

Patented May 25, 1937

2,081,489

UNITED STATES PATENT OFFICE 2,081,489

FRUIT AND VEGETABLE CLEANING AND POLISHING MACHINE

Howard C. Lisle and James W. Morse, Lansing, Mich., assignors to Food Machinery Corporation, San Jose, Calif., a corporation of Delaware Application April 3, 1933, Serial No. 664,229

10 Claims. (Cl. 146—202)

This invention relates to a machine for brushing, polishing and cleaning fruit and vegetables and other articles that are of a rollable nature and is particularly adapted to the treatment of potatoes and apples and like fruits, the treatment of the potatoes being for the removal of dirt mainly and leaving the potato in a nice clean and polished condition, and the treatment of apples and the like for the removal of spray residue and other accumulations of dirt of various kinds.

More or less of earth and dirt adheres to potatoes when they are harvested and in order to place them in the best marketable condition the adhering dirt and residue should be thoroughly cleaned off and the skins polished so the product will present the most attractive appearance.

During the growing season of fruit, and the like, spray residue accumulates on the fruit as well as other undesirable deposits, which may consists of, according to the location, acid-soluble residues; acid-insoluble residues such as elemental sulphur and road dust, and insect smutting or specking. Leafhoppers often appear in such numbers at harvest time that the fruit becomes "fly-specked" with excrement. This specking is most prominent on such varieties as Rhode Island Greening and other green or yellow varieties. Fruit picked after the 1st of September is especially likely to bear hopper residues since this period follows the extensive feeding of the second brood of the insect.

Sticky, blackened streaks and spots may occur on apples when the trees become infested with green aphis. Similar residues often appear on pears infested with pear Psylla. These insects secrete a sweet substance known as honey dew which serves as a suitable medium for the growth of a black spore-forming fungus (*Fumago vagans* Fries). In instances where large quantities of honey dew and the fungous growths, associated with it, accumulate on the fruit it becomes decidedly objectionable.

The apparatus of this application comprises a series of brushing rolls arranged on a slight incline over which the fruit or vegetable is conveyed by the rotative action of the brushes. The brushes are rotated positively and every other brush is given a greater speed of rotation so that the fruit is given a thorough brushing action and turned over and over during this operation to bring all surfaces into contact with the treating elements. The brushes are preferably made of soft horse hair for cleaning and since the adjacent brushes revolve at slightly different speeds the fruit is given a thorough cleaning during its passage through the machine. A series of polishing brushes, of cloth or the like, are placed directly over the bed of cleaning brushes and are rotated at a speed to give a bright and thorough polish to the fruit surfaces to thereby enhance the appearance. Provision is also made for handling two different grades or kinds of product at the same time or to reduce the capacity of the machine.

This desirable feature is accomplished by placing a division board longitudinally through the machine just over the brushes and about in the center if two different products are to be handled, and at any lateral location desired if only the capacity of the machine is to be reduced, which is sometimes desirable on account of reduced yield or other conditions.

Provision is also provided, in the case of cleaning potatoes, of carrying the stream of potatoes over a short inclined conveyor of the spaced roller type, which rolls the potatoes over and over and tends to loosen and remove some of the adhering earth or other residue before they reach the cleaning brushes. Besides acting as a preliminary cleaning device this short section of the machine also serves as an inspection section where an operator can remove, by hand, such of the product as is not desirable.

Also in the cleaning of potatoes a suction fan is provided to create somewhat of a vacuum in and about the cleaning zone to carry away all dust and flying debris and keep the machine clean and thereby permit the rolls to do much better work and turn out a product that is most thoroughly cleaned and carries a high polish.

It is therefore an object of the invention to provide a machine that will both clean and polish fruit at the same time.

It is a further object of the invention to provide a machine that will handle two different sizes of fruit or vegetables at the same time without intermixing the product.

It is also an object of the invention to provide a machine that will have means for reducing the capacity thereof while running at the full capacity speed.

It is also an object of the invention to provide a machine having a preliminary cleaning and inspection section operating in conjunction with the brushing and polishing section.

It is also an object of the invention to provide a machine having means for running the brushing rolls at differential speeds to help in turning and polishing the product.

It is also an object of the invention to provide in a cleaning and polishing machine means for controlling the movement of product through the machine by the quantity of product fed to the machine.

It is also an object of the invention to remove the arsenic and lead residues accumulated by the fruit during the growing season which the Government says are harmful to the consumers and has established a minimum that may be present on the fruit when marketed.

It is a further object of the invention to provide brush rolls and buffers that have differential speeds so that each fruit will be rubbed and polished while it is turned by the brushes due to the friction created by the differential speeds.

It is also an object of the invention to polish the fruit at the same time it is cleaned and in exerting a pressure on the fruit to increase the friction of the brushes through the centrifugal action of the soft buffers bearing on the fruit directly over the fruit, the buffers running in the opposite direction from the brushes thereby accentuates this polishing action.

It is also a further object of the invention to provide a machine having suction means associated with the cleaning and polishing means for carrying away the residues removed by the cleaning means and thus keep the machine parts clean and add to the finished appearance of the product.

It is also an object of the invention to place a spiral groove in the cleaning rolls in order to give the product a side roll which greatly facilitates the cleaning and polishing effect.

With such objects in view as well as other advantages that may be inherent in the invention, the novel structural peculiarities, novel organization of elements, and the separate and collective operations involved in carrying out the recited objects of the invention, which will be made the subject matter of claims hereto appended, it is to be understood that the several necessary elements and combinations constituting the same may be varied in their proportions, placement, general arrangement and operative relations without departing from the scope and nature of the invention.

In carrying out the objects of the invention in an operative machine, further objects and advantages have been evolved than have been recited, and in order to make the invention more clearly understood there are shown in the accompanying drawings, means and mechanism embodying the preferred structural arrangement and the preferred disposition of the operative elements and combinations, in which has been illustrated only one way of embodying the creative part or concept of the invention. The described devices are simply embodiments of the invention which other structures might also employ and some of the parts or combinations may be used without the others in different types of such machines without departing from the purview of the invention and we therefore regard ourselves as entitled to such variations and changes from the shown and described devices as will fall within the scope and meaning of the claims.

The drawings have been made with a view to illustration only, they are not necessarily made to scale and some parts may be made more or less out of proper proportion to better show the operation and arrangement of the operative elements. With this understanding we may now refer to the drawings where a clearer understanding of the machine and its operation will be had.

Figure 1 is a side elevation of a machine adapted for the treatment of potatoes and is partly in section to better show the operation.

Figure 2 is a cross sectional elevation on substantially the line 2—2 of Figure 1 and is intended to show only a lateral view of the brushes and polishing rolls.

Figure 3 is a detail showing the construction of the polishing rolls.

Figure 4 is a vertical elevation of a machine adapted to the treatment of fruits, and apples are shown as the fruit. This view is partly in section to show the operation and relative positions of the parts.

Figure 5 is a perspective of a section of the brushing rolls showing the division board for the handling of two different grades or kinds of product, or for reducing the capacity of the machine by restricting the product to a lesser area of the brushing surface.

Figure 6 is a partial view of the belt that conveys the fruit to the brushing rolls showing the perforations by means of which the culls and small fruit are sized out of the stream as it advances to the brushes.

Figure 9 is a view showing the manner of mounting and adjusting the division board by means of which the capacity of the machine may be regulated.

Figure 10 is a fragmentary view somewhat exaggerated as to size and parts to show the manner of driving the brush rolls at varying speed with one drive chain.

Figure 7:
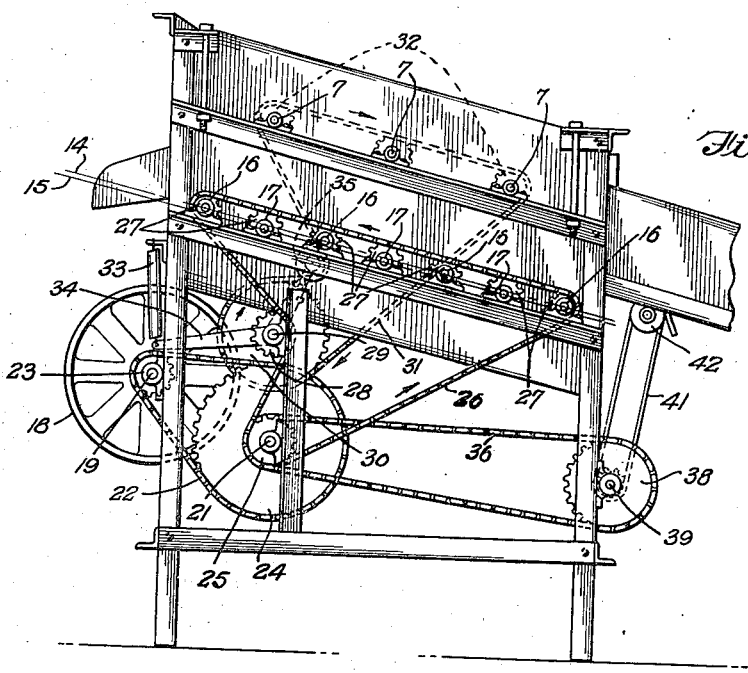
Figure 7 is a side elevation of the machine of Figure 4 to clearly show the drive means for the various parts of the moving elements.
Figure 8:
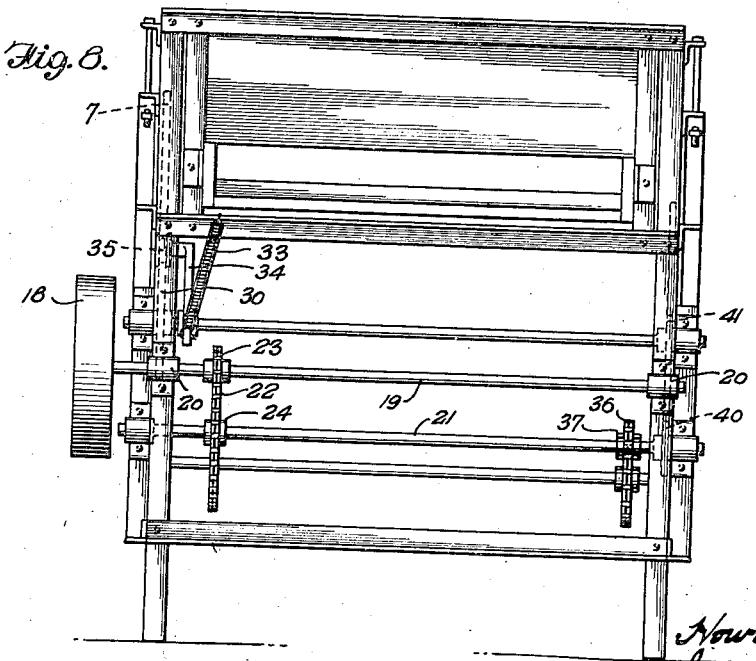
Figure 8 is an end elevation of Figure 7 looking from the left.

The operative elements of the machine are carried on a suitable framework designated generally by the numeral 1.

2 represents the series of cleaning, brushing and product propelling rolls arranged with their axes parallel and spaced to form a supporting and brushing surface, the surface being preferably inclined slightly from the feed end to the discharge end so that more or less retardation is offered to the forward movement of the product being treated.

3 represents the division board or wall interposed longitudinally through the machine, directly over the cleaning brushes 2 to thereby divide the supporting surface into two lanes of travel for the product so that two grades of the same product or two different products may be treated at the same time, or the division board may be placed to reduce the operative area of the brushes so that with a smaller stream of product the valleys between brushes may be filled for purpose of controlling the flow of product through the machine. Figure 9 shows how the division board may be mounted and controlled in its positioning. To the top edge of the board may be fastened an adjusting rod 4 passing through the side wall 5 of the machine and held in position by set screws 6, sufficient rods 4 being provided to securely hold the board in any desired position. In Figure 9 the board is shown adjusted to confine the fruit or the like to a narrow lane, which permits the use of a full size machine to a restricted capacity and still have the controlled feeding effect of the specially proportioned and operated brushing rolls.

7 represents the polishing brushes placed directly over cleaning rolls 2, these polishing elements being preferably made of strips of cotton flannel secured on the shaft as is indicated in Figure 3. Figure 2 shows how they appear when in operative position on the polisher shafts.

Referring to Figure 1 it will be seen how potatoes are handled. The potatoes with the adhering dirt are supplied to the feed trough 8 by any suitable means and gradually roll down onto the roller feed chain 9 wherein the rollers are spaced apart to leave free openings therebetween so that any dirt that is loosened by the rollers will fall therethrough and give a preliminary cleaning to the product. From the roller conveyor the potatoes pass directly onto the cleaning brushes.

An operator placed at this point can act as an inspector and remove by hand any undesirable product before it enters the brushing zone. The stippling on the potatoes coming down the chute 8 and passing over the roller conveyor 9 represents surface dirt and the absence of stippling at the discharge end of the machine indicates that the product is cleaned and polished.

By reference to Figure 4 is will be seen how apples or like fruit are handled. In this case the fruit is delivered to the chute 10 from where it passes onto the perforated sizing and conveying belt 11. The perforations 12 being of a size to just pass the small and imperfect fruit which drops into the receptacle 13. This permits only marketable fruit to get into the cleaning machine. The fruit that moves to the cleaning machine passes onto the cleaning brushes by means of which it is carried across the brushes from valley to valley according to the quantity of fruit fed to the machine.

The control of the movement of the product from valley to valley is by a peculiar action shown for the first time in this invention, as far as applicants are aware.

The cleaning brushes 2 are arranged in parallel relation in the machine to form the sole supporting surface for the body of product passing through the machine, and they are spaced apart slightly to form laterally disposed valleys between brushes. The brushes are spaced substantially equally longitudinally of the path of travel of the product but every other brush is occupying a different vertical position relative to the brush on either side.

By referring to Figure 7 the center line 14 represents the plane of the axes of the brushes 16 and the center line 15 represents the plane of the axes of the brushes 17. It is seen that the brushes on the center line 15 are set lower vertically than the brushes on the center line 14. The cotton polishing brushes 7 are in each instance directly over the valleys between a 16 and 17 brush with a valley between the polishing brushes wherein the fruit has no contact with the polishing brushes.

It has been found by exhaustive experiment that if a series of brushes like 16 and 17 are placed all on the same horizontal plane with suitable valleys formed therebetween for the reception of the fruit, and the brushes rotated at prescribed speeds the fruit will tend to accumulate in the first valley until that valley is filled and if no further fruit was supplied the fruit would remain in that valley indefinitely, since the tractive effect of the brush surfaces at the speed they are traveling is not sufficient to lift the fruit over the advanced brush roll, but if one additional fruit is supplied to the filled valley the urge of that single fruit to get into the valley will add just sufficient pressure to a fruit to increase the tractive effect of the rotating brush to lift the urged fruit over the adjacent roll into the next valley, and the single fruit that effected this change will take the place of the displaced fruit. If, therefore, one hundred fruit per minute were fed to the first valley, that was filled with fruit that could not pass any further, fruit would be displaced from the valley until one hundred fruit had passed into the next valley when the action would stop if no more fruit were forthcoming; if fruit were continuously fed to the first valley at the rate of one hundred per minute, fruit would be discharged from the last valley of the series at the rate of one hundred per minute continuously. By this means of control the capacity of the machine is exactly in proportion to the fruit fed thereto per minute.

The foregoing procedure is correct for a machine where the rolls are placed in a substantially horizontal position or inclined slightly and with no contact of any kind on the tops of the fruit.

As soon as we placed the polishing rolls over the fruit as in this invention it was found that the feed control was more or less destroyed by the contact with the tops of the fruit in the valleys, resulting in substantially the same effect as if additional fruit was fed to a filled valley. The contact and urge of the polishing rolls so increased the tractive effect between the brushes and the fruit that it immediately passed to the next valley. To overcome this effect the brush rolls were placed on an incline and the speeds of the rolls so timed that there was not sufficient tractive effect to pass the fruit from the valleys, but that the contact of the polishing rolls was needed to effect the displacement of the fruit from valley to valley. This worked all right for the brushes directly under the polishing rolls but was not just right for the valleys between the polishing rolls. To overcome this defect the rolls 16 and 17 were placed in slightly different vertical planes so that where the urge of the polishing rolls was absent over a valley the urge of the oncoming fruit would displace the fruit in that valley and cause it to override the forward roll or brush and enter the next valley.

This placement of the centers of adjacent brush rolls and the proper speeds thereof gives a condition wherein the combined urge of the oncoming fruit and the contact of the polishing rolls were necessary to cause the fruit to move from the valley under a polishing roll, because there the forward roll is higher than the adjacent roll and the fruit therefore has to climb higher to get into the next valley, but in the valley where there is no top contact of the polishing rolls the forward roll is lower than the adjacent roll and the single urge of the oncoming fruit is sufficient to effect displacement and cause the fruit to move over the lower brush into the next valley.

It has been found by experiment that a rotative speed of about 120 revolutions per minute for the 16 or the highest brushes and a rotative speed of 90 for the 17 or lower brushes and a speed of about 525 revolutions per minute for the polishing brushes gave the desired result, although it is understood that with different diameter brushes the rotative speeds would vary. The diameter of the brushes is approximately 4½ inches and of the polishing rolls around ten inches.

This arrangement gives differential speeds between pairs of cleaning brushes which together with spiral grooves around the surfaces of the brushes cause a constant turning of the product so that all sides will be most thoroughly cleaned and polished.

The above conditions of feed control will prevail with any easily rollable product so long as the angle of inclination is around 12 to 15 degrees and the speeds of rolls as indicated.

By the described arrangement also, it became possible to operate the machine at a minimum degree of inclination. By reason of the arrangement of the buffer rolls with respect to the alternately elevated brush rolls, the additional urge exerted by the polishing or buffer rolls is applied to the product at those points where they meet with the greatest resistance to their advance, viz., the elevated rolls. In other words, the resistance to the advance of the product is alternately greater and less throughout the length of the machine, and at the points where the resistance is the greatest the action of the buffers serves to offset this resistance, thereby in effect providing a uniform resistance throughout the machine.

This machine therefor provides a brush runway in which there are alternately different inclinations. The inclination up which the product travels being less from the forward side of each elevated brush to and over the depressed brush ahead than the inclination up which the product travels from the forward side of each depressed brush to and over the next elevated brush. The resistance to the advance of the product, accordingly, is alternately increased and decreased. The resistance at the decreased points being such that the product may advance over the brushes from the urge of oncoming product alone, and the resistance at the increased points being sufficiently overcome by the combined action of the buffer rolls and the oncoming product, so the product may move through the machine without hindrance.

The drive for the various operative elements is through the following chain of mechanism.

Any power source may be employed, but for simplicity there is shown a belt pulley 18 supported by a cross shaft 19 finding suitable support in bearings 20 secured to the frame of the machine. Power is first transmitted from the shaft 19 to the shaft 21 through the chain 22 riding over the sprockets 23 and 24. The sprocket 25 on the shaft 21 drives the chain 26 in the direction of the arrow and the chain 26 in turn trains over the tops of the sprockets 27 on the brush roller shafts 16 and 17, thus driving all of the brush rolls in the same direction. The return of the chain 26 rides over the sprocket 28 on the cross shaft 29 and thereby acts as a drive for this shaft. On the shaft 29 is the sprocket 30 carrying the chain 31 which rides over the sprockets 32 on the ends of the buffer roll shafts 7 and thereby gives rotation to the buffers. The chain 31 is kept tight by means of the tension spring 33 holding the arm 34 and the idler 35 against the chain. Another chain 36 driven by the sprocket 37 from the shaft 21 trains over the sprocket 38 on the cross shaft 39, turning this shaft which in turn through a sprocket 40, the chain 41 and sprocket 42 drives the sizing belt 11 of Fig. 4.

In the machine of Figure 1 the suction fan 43 is driven from the shaft 19 by means of suitable pulleys 44 and 45 and the belt 46. The suction fan with this machine when used for cleaning potatoes, produces a partial vacuum in and around the brushes and buffers and thus draws away all flying dust and debris so that the machine and the product are kept clean and free of accumulating dust.

The roller conveyor 9 is dispensed with when the potatoes are delivered to the cleaning machine directly from a sizer, in which case the potatoes pass directly to the brush rolls at the point "A". The conveyor mounting is such that the section can be quickly removed to make room for the end of the chute from the sizer which is indicated by the dotted lines at this point.

It will be noticed that the buffers do not look the same in Fig. 1 and Fig. 3. In Fig. 3 the buffer is shown at rest and in Fig. 1 the buffers are shown as rotating.

Referring further to the manner of driving the brush rolls 16 and 17 at the varying speeds mentioned, if reference is had to Fig. 10 which is a diagrammatic view somewhat exaggerated as to size and location of parts, it will be seen how the rolls occupying the different planes may be driven from the same power chain and give the different speeds to the alternate rolls.

The center lines of the roll shafts are here shown as much widened relative to the size of the sprockets on the rolls 16 and 17 so as to clearly show the difference in size of the sprockets and that by having the tops of the sprockets on a line the single chain 26 will train over the small and large sprockets in substantially a straight line and thus serve as a power source for all rolls. A plate 43 may be placed just above the chain 26 to hold it down on the sprockets so it will not jump off the teeth when the chain stretches some.

On page 1 of these specifications mention has been made of the various deposits accumulating on the fruit during its time in the orchard. It is not meant by this statement that this machine will remove all of these deposits under any and all working conditions, but it will remove a very large part of them and in some instances will remove all of them, and especially so if the fruit is damp or wet during the cleaning operation.

What we claim as new and desire to secure by Letters Patent is:

1. In an apparatus for treating fruit and the like a series of treating rolls arranged in adjacent fruit supporting relation and forming valleys therebetween disposed transversely of the flow of fruit thereover, means for driving said rolls in a common direction of rotation, and a buffer mounted above one of the valleys formed between a pair of said rolls for buffing engagement with fruit in said valley, the roll of said pair at the exit side of a said valley being positioned with its top surface projecting above the top surface of the adjacent roll at the inlet side of said valley to prevent the fruit from being advanced by its increased traction with the rolls effected by its engagement with the buffer.

2. In an apparatus for treating fruit and the like, a series of treating rolls arranged in adjacent fruit supporting relation and forming valleys therebetween disposed transversely of the flow of fruit thereover, means for driving said rolls in a common direction of rotation, buffing means mounted above a plurality of the valleys formed between said rolls for buffing engagement for fruit in said valleys, the top surfaces of the rolls at the exit sides of said valleys beneath the buffing means being elevated above the top surface of the adjacent rolls at the inlet sides of said valleys beneath said buffing means, said elevation being sufficient to prevent the fruit from being advanced from a valley beneath a buffing means by the increased traction of the fruit with the rolls effected by the engagement of the fruit with said buffing means.

3. In an apparatus for treating fruit and the like, a series of treating rolls arranged in adjacent fruit supporting relation and constituting a fruit treating runway having valleys between said rolls disposed transversely of the flow of fruit thereover, means for driving said rolls in a common direction of rotation, a buffer mounted above one of the valleys formed between a pair of said rolls for buffing engagement with fruit in said valley, the roll of said pair at the exit side of a said valley being positioned with its top surface projecting above the top surface of the adjacent roll at the inlet side of said valley to prevent the fruit from being advanced by its increased traction with the rolls effected by its engagement with the buffer, and means for varying the effective width of said runway to vary the rate of advance of the fruit thereover with respect to the rate of feed thereto.

4. In an apparatus for treating fruit and the like, a series of treating rolls arranged in adjacent fruit supporting relation and constituting a fruit treating runway having valleys between said rolls disposed transversely of the flow of fruit thereover, means for driving said rolls in a common direction of rotation, buffing means mounted above a plurality of the valleys formed between said rolls for buffing engagement for fruit in said valleys, the top surfaces of the rolls at the exit sides of said valleys beneath the buffing means being elevated above the top surfaces of the adjacent rolls at the inlet sides of said valleys beneath said buffing means, said elevation being sufficient to prevent the fruit from being advanced from a valley beneath a buffing means by the increased traction of the fruit with the rolls effected by the engagement of the fruit with said buffing means, and a divider extending longitudinally of said runway, said divider being adjustable laterally of the runway to vary the rate of advance of the fruit over the runway on either side of the divider with respect to the rate of feed thereto.

5. An apparatus for cleaning and buffing rollable articles such as fruit, vegetables and the like, comprising spaced rotatable cleaning rolls defining an article supporting valley therebetween for treatment of articles admitted to and discharged from said valley at right angles to the axis of rotation of said rolls, the rotation of said rolls serving to clean successive articles delivered to and supported thereby, buffing means movably mounted above said valley and engageable with the upper surfaces of said articles to buff the same coincidentally with the cleansing action imparted to the lower surface of the articles by said rolls, means for rotating said cleaning rolls and actuating said buffing means, the periphery of the cleaning roll toward the discharge end of the apparatus being disposed at a higher level relative to the horizontal than the periphery of the cleaning roll toward the receiving end of the apparatus to prevent the combined tractive action of said cleaning rolls and said buffing means from advancing the articles from said valley transversely of said rolls, thereby insuring complete cleaning and buffing of the articles while retained within said valley, the engagement and urge of articles subsequently delivered to the machine when contacting the articles supported in said valley being sufficient to overcome the tendency of the latter mentioned articles to remain therein and advance the same therefrom transversely of the rolls, whereby the speed of said cleaning rolls and buffing means may remain constant and the time of treatment of said articles is controlled entirely by the rate of delivery of said articles to the valley between said cleaning rolls and buffing means.

6. An apparatus for cleaning and buffing rollable articles such as fruit, vegetables and the like, comprising spaced rotatable cleaning rolls defining an article supporting valley therebetween for treatment of articles admitted to and discharged from said valley at right angles to the axis of rotation of said rolls, the rotation of said rolls serving to clean successive articles delivered to and supported thereby, buffing means movably mounted above said valley and engageable with the upper surfaces of said articles to buff the same coincidentally with the cleansing action imparted to the lower surface of the articles by said rolls, means for rotating said cleaning rolls and actuating said buffing means, the periphery of the cleaning roll toward the discharge end of the apparatus being disposed at a higher level relative to the horizontal than the periphery of the cleaning roll toward the receiving end of the apparatus to prevent the combined tractive action of said cleaning rolls and said buffing means from advancing the articles from said valley transversely of said rolls thereby insuring complete cleaning and buffing of the articles while retained within said valley, means for delivering rows of articles to be cleaned and buffed to said valley, the engagement and urge of articles delivered to the machine when contacting the articles supported in said valley being sufficient to overcome the tendency of the latter mentioned articles to remain therein and advance the same therefrom transversely of the rolls, whereby the speed of said cleaning rolls and buffing means may remain constant and the time of treatment of said articles is controlled entirely by the rate of delivery of said articles to the valley between said cleaning rolls and buffing means.

7. An apparatus for cleaning and buffing rollable articles, such as fruit, vegetables and the like, comprising a series of spaced rotatable cleaning rolls defining article supporting valleys therebetween, the rotation of said rolls serving to clean successive articles delivered to and supported thereby from valley to valley, buffing means movably mounted above alternate valleys and engageable with the upper surfaces of said articles to buff the same coincidentally with the cleaning action imparted to the lower surface of the articles by said rolls, means for rotating said cleaning rolls and actuating said buffing means, the periphery of the cleaning roll toward the discharge end of each valley beneath said buffing means being disposed at a higher level relative to the horizontal than the periphery of the cleaning roll toward the receiving end of such valley to prevent a combined tractive effect of said cleaning rolls and said buffing means from advancing the articles transversely of said rolls from said valley to the next adjacent valley, thereby insuring complete cleaning and buffing of the articles while retained within the valley beneath said buffing means, means for delivering rows of articles to be cleaned and buffed to the first valley beneath a said buffing means, the engagement and urge of articles delivered to the machine when contacting previously delivered articles supported in said last mentioned valley being sufficient to overcome the tendency of the latter mentioned articles to remain therein and advance the same therefrom from valley to valley, whereby the speed of said cleaning rolls and buffing means may remain constant and the time of treatment of said articles is controlled entirely by the rate of delivery of said articles to the first valley beneath said buffing means.

8. An apparatus for cleaning and buffing rollable articles, such as fruit, vegetables and the like, comprising a series of spaced rotatable cleaning rolls defining article supporting valleys therebetween, the rotation of said rolls serving to clean successive articles delivered to and supported thereby from valley to valley, buffing means movably mounted above alternate valleys and engageable with the upper surfaces of said articles to buff the same coincidentally with the cleansing action imparted to the lower surface of the articles by said rolls, means for rotating said cleaning rolls and actuating said buffing means, the periphery of the cleaning roll at the discharge end of each valley beneath said buffing means being disposed at a higher level relative to the horizontal than the periphery of the cleaning roll at the receiving end of such valley to prevent a combined tractive effect of said cleaning rolls and said buffing means from advancing the articles transversely of said rolls from said valley to the next adjacent valley, thereby insuring complete cleaning and buffing of the articles while retained within the valley beneath said buffing means, the periphery of the cleaning roll toward the discharge end of each alternate valley wherein buffing means are not disposed thereabove being at a lower level relative to the horizontal than the periphery of the cleaning roll toward the receiving end of such valley to compensate for the absence of buffing means above said valley and insure uniform advance of the articles to the next succeeding valley when engaged by articles discharged from the valley immediately in rear thereof, means for delivering rows of articles to be cleaned and buffed to the first valley beneath a said buffing means, the engagement and urge of articles delivered to the machine when contacting previously delivered articles supported in said last mentioned valley being sufficient to overcome the tendency of the latter mentioned articles to remain therein and advance the same therefrom from valley to valley, whereby the speed of said cleaning rolls and buffing means may remain constant and the time of treatment of said articles is controlled entirely by the rate of delivery of said articles to the first valley beneath said buffing means.

9. An apparatus for cleaning and buffing rollable articles, such as fruit, vegetables and the like, comprising a series of spaced rotatable cleaning rolls defining article supporting valleys therebetween, the rotation of said rolls serving to clean successive articles delivered to and supported thereby from valley to valley, rotary buffing means movably mounted above alternate valleys and engageable with the upper surfaces of said articles to buff the same coincidentally with the cleansing action imparted to the lower surface of the articles by said rolls, means for rotating said cleaning rolls and rotating said buffing means, the periphery of the cleaning roll toward the discharge end of each valley beneath said buffing means being disposed at a higher level relative to the horizontal than the periphery of the cleaning roll toward the receiving end of such valley to prevent a combined tractive effect of said cleaning rolls and said rotary buffing means from advancing the articles transversely of said rolls from said valley to the next adjacent valley, thereby insuring complete cleaning and buffing of the articles while retained within the valley beneath said buffing means, means for delivering rows of articles to be cleaned and buffed to the first valley beneath a said buffing means, the engagement and urge of articles delivered to the machine when contacting previously delivered articles supported in said last mentioned valley being sufficient to overcome the tendency of the latter mentioned articles to remain therein and advance the same therefrom from valley to valley, whereby the speed of said cleaning rolls and rotary buffing means may remain constant and the time of treatment of said articles is controlled entirely by the rate of delivery of said articles to the first valley beneath said buffing means.

10. The method of treating rollable fruits or the like by passing the same over a treating runway consisting of a series of transversely arranged treating rolls having valleys therebetween to support the fruit for treatment therein, said fruit being passed between said rolls and movable buffer means mounted over alternate valleys, said method comprising the steps of delivering the fruit to the valleys between adjacent treating rolls, rotating said treating rolls in a common direction to subject the fruit to rolling contact therewith sufficient to treat the fruit, elevating the periphery of the treating roll at the exit end of each valley beneath a buffer means relative to the periphery of the treating roll at the inlet end thereof and thereby limiting the traction between the fruit and the treating rolls and buffer means so that the fruit will not be advanced from valley to valley by the combined tractive effect alone of said treating rolls and buffer means, and advancing the fruit from valley to valley over said runway by the urge of additional fruit delivered to the valleys into engagement with the fruit therein, and regulating the rate of advance of the fruit over said runway from valley to valley by varying the effective width of said runway.

HOWARD C. LISLE.
JAMES W. MORSE.